(12) United States Patent
Tanoue et al.

(10) Patent No.: US 7,255,519 B2
(45) Date of Patent: Aug. 14, 2007

(54) MACHINE TOOL

(75) Inventors: Shinn Tanoue, Yamatokoriyama (JP); Ryuichi Fujiwara, Yamatokoriyama (JP); Toshiaki Kotaka, Yamatokoriyama (JP); Hikaru Ishigaki, Yamatokoriyama (JP)

(73) Assignee: Mori Seiki Co., Ltd., Yamatokoriyama-shi (JP)

( * ) Notice: Subject to any disclaimer, the term of this patent is extended or adjusted under 35 U.S.C. 154(b) by 0 days.

(21) Appl. No.: 11/580,104

(22) Filed: Oct. 13, 2006

(65) Prior Publication Data

US 2007/0031204 A1 Feb. 8, 2007

Related U.S. Application Data

(62) Division of application No. 11/159,388, filed on Jun. 23, 2005, now Pat. No. 7,172,375.

(51) Int. Cl.
*B23Q 1/00* (2006.01)
*B23Q 11/08* (2006.01)

(52) U.S. Cl. .............. 409/134; 409/202; 409/212; 409/234; 83/939

(58) Field of Classification Search .............. 409/134, 409/137, 202, 201, 211, 206, 234, 235, 212; 408/234; 83/939, 940, 941
See application file for complete search history.

(56) References Cited

U.S. PATENT DOCUMENTS

| 5,350,262 | A | 9/1994 | Michaelis et al. |
| 5,786,557 | A | 7/1998 | Girardin |
| 5,871,312 | A * | 2/1999 | Haninger et al. ........... 409/134 |
| 6,068,431 | A | 5/2000 | Line |
| 6,719,506 | B2 | 4/2004 | Chang et al. |
| 6,798,088 | B2 | 9/2004 | Hsu et al. |

FOREIGN PATENT DOCUMENTS

| FR | 2 715 336 A | 7/1995 |
| JP | 8-150534 A | 6/1996 |
| JP | 2001-219325 A | 8/2001 |
| JP | 2005-262375 A | 9/2005 |

* cited by examiner

*Primary Examiner*—Dana Ross
(74) *Attorney, Agent, or Firm*—Smith Patent Office

(57) ABSTRACT

The present invention provides a machine tool capable of suppressing cost increase of a cover even when a long workpiece is machined. A machining unit 3 by which the spindle 2 is supported to be movable in X-axis, Y-axis, and Z-axis directions relative to the machining table 5; and a shielding mechanism 100 provided in said machining unit 3 to prevent chips and coolant from scattering out of a machining area.

6 Claims, 7 Drawing Sheets

MACHINE TOOL

CROSS REFERENCE TO RELATED APPLICATION

This application is a divisional application of U.S. patent application Ser. No. 11/159,388 filed on Jun. 23, 2005, now U.S. Pat. No. 7,172,375. The disclosure of U.S. patent application Ser. No. 11/159,388 is hereby incorporated by reference.

BACKGROUND OF THE INVENTION

1. Field of the Invention

The present invention relates to a machine tool in which a spindle with a tool attached thereto is supported to be relatively movable in X-axis, Y-axis, and Z-axis directions, and more particularly, to a structure of a machine tool capable of machining a wide and long workpiece efficiently.

2. Description of the Related Art

As a gantry-type machining center for machining a relatively long workpiece, there is one described in, for example, Japanese Patent Application Laid-open No. 2001-219325 (patent document 1) or Japanese Patent Application Laid-open No. Hei 8-150534 (patent document 2). The one described in the patent document 1 is structured such that a gate-shaped column 7 is disposed on a long bed 2 to be movable in an X-axis direction, a saddle 25 is disposed on a front face of a cross rail 7c of a column 7 to be movable in a Y-axis direction, a ram 30 is disposed on the saddle 25 to be movable in a Z-axis direction, and a spindle 31 with a tool 32 attached thereto is disposed on the ram 30.

In a machining center of this type, a relatively long workpiece W is placed on the bed 2, and then the column 7, the saddle 25, and the ram 30 are relatively moved in the X-axis, Y-axis, and Z-axis directions respectively, and whereby the spindle 31 applies predetermined machining to the workpiece W.

SUMMARY OF THE INVENTION

Moreover, in the above-described machining center, an outer periphery of the machine main body is generally surrounded and shielded by a cover in order to prevent chips and coolant from scattering out of the machine during the machining.

However, in a machine tool for machining a relatively large and long workpiece, if the structure that a cover shields an outer periphery of a machine main body as in the above-described conventional machine tool is adopted, the cover needs to be large since the area to be shielded is large, which poses a problem of cost increase.

It is an object of the present invention to provide a machine tool capable of suppressing cost increase of a cover even when a long workpiece is machined.

According to the present invention, provided is a machine tool in which a spindle with a tool attached thereto is relatively moved to apply predetermined machining to a workpiece placed on a machining table, the machine tool including: a machining unit by which the spindle is supported to be movable in X-axis, Y-axis, and Z-axis directions relative to the machining table; and a shielding mechanism provided in the machining unit to prevent chips and coolant from scattering out of a machining area.

In the present invention, the shielding mechanism is provided in the machining unit that movably supports the spindle, so that the shielding mechanism can be downsized, leading to suppression of cost increase compared with a conventional case where the whole outer periphery of the machine main body is shielded.

According to a preferable embodiment of the present invention, the machining unit includes a column in which front and rear end portions of right and left column main bodies disposed on right and left sides of the machining table are coupled by front and rear cross frames; the spindle is disposed in a portion surrounded by the front and rear cross frames and the right and left column main bodies with an axis thereof being set substantially vertical; and the shielding mechanism includes front and rear shielding members hung from the front and rear cross frames to be vertically movable and opening/closing front and rear openings formed by the column main bodies, the cross frames, and the machining table.

In this embodiment, the column is structured such that the front and rear end portions of the right and left column main bodies are coupled by the front and rear cross frames, and the shielding mechanism includes the front and rear shielding members opening/closing the front and rear openings formed by the right and left column main bodies, the cross frames, and the machining table. Therefore, right and left sides of the machining area by the spindle can be shielded by the column main bodies, and it is only necessary to shield the front and rear openings formed by the right and left column main bodies and the front and rear cross frames. This allows the shielding members to be downsized compared with a conventional case where the whole outer periphery of the machine main body is shielded, realizing suppression of cost increase.

According to another preferable embodiment of the present invention, the machining table has a plurality of machining areas arranged in one direction; the machining unit is mounted on a long bed extending in the arrangement direction of the machining areas to be movable in the arrangement direction of the machining areas, and moves the spindle in the X-axis, Y-axis, and Z-axis directions while being kept positioned in one of the machining areas, thereby machining the workpiece; and the front and rear shielding members open/close the front and rear openings while the machining unit is kept positioned in one of the machining areas.

In this embodiment, the shielding members open/close the front and rear openings while the machining unit moved to one of the machining areas is kept positioned therein. Therefore, when a long workpiece placed on the machining table is machined, the openings above the workpiece can be shielded.

According to still another embodiment of the present invention, the shielding members have: front and rear stick members bridged between the right and left column main bodies; and a large number of band-plate shaped curtain plates hung from and supported by the front and rear stick members, and the stick members are driven by a driving mechanism to move up/down between a closing position for substantially closing the openings and an opening position for opening the openings.

In this embodiment, a large number of the band-plate shaped curtain plates hung from and supported by the stick members are driven to move up/down between the closing position and the opening position. Therefore, only a simple structure is necessary and no special installation space is needed for disposing the shielding member. In addition, the curtain plates can be kept lifted when the machining unit is moved to the next machining area, so that the interference to the workpiece by the curtain plates can be prevented.

According to yet another embodiment of the present invention, the curtain plates are hung from the stick members to be vertically movable and stop at a position abutting on the workpiece when the stick members are moved down to the closing position.

In this embodiment, when the curtain plates move down to abut on the workpiece, they stop at this position. Therefore, when a long workpiece in a shape having different height positions is machined, it is possible to automatically and surely shield the openings above the workpiece.

According to yet another embodiment of the present invention, each of the curtain plates is composed of an upper plate supported by the stick member and a lower plate supported by the upper plate to be vertically movable, and when the stick members are moved down to the closing position, the lower plates stop at a position abutting on the workpiece.

In this embodiment, each of the curtain plates is composed of the upper plate supported by the stick member and the lower plate supported by the upper plate to be movable in the up/down direction. Therefore, the lower plates relatively move in an upward direction, so that with a simple structure, it is possible to automatically and surely shield the openings above a long workpiece in a shape with different height positions.

DETAILED DESCRIPTION OF THE PREFERRED EMBODIMENTS

Figure 1:
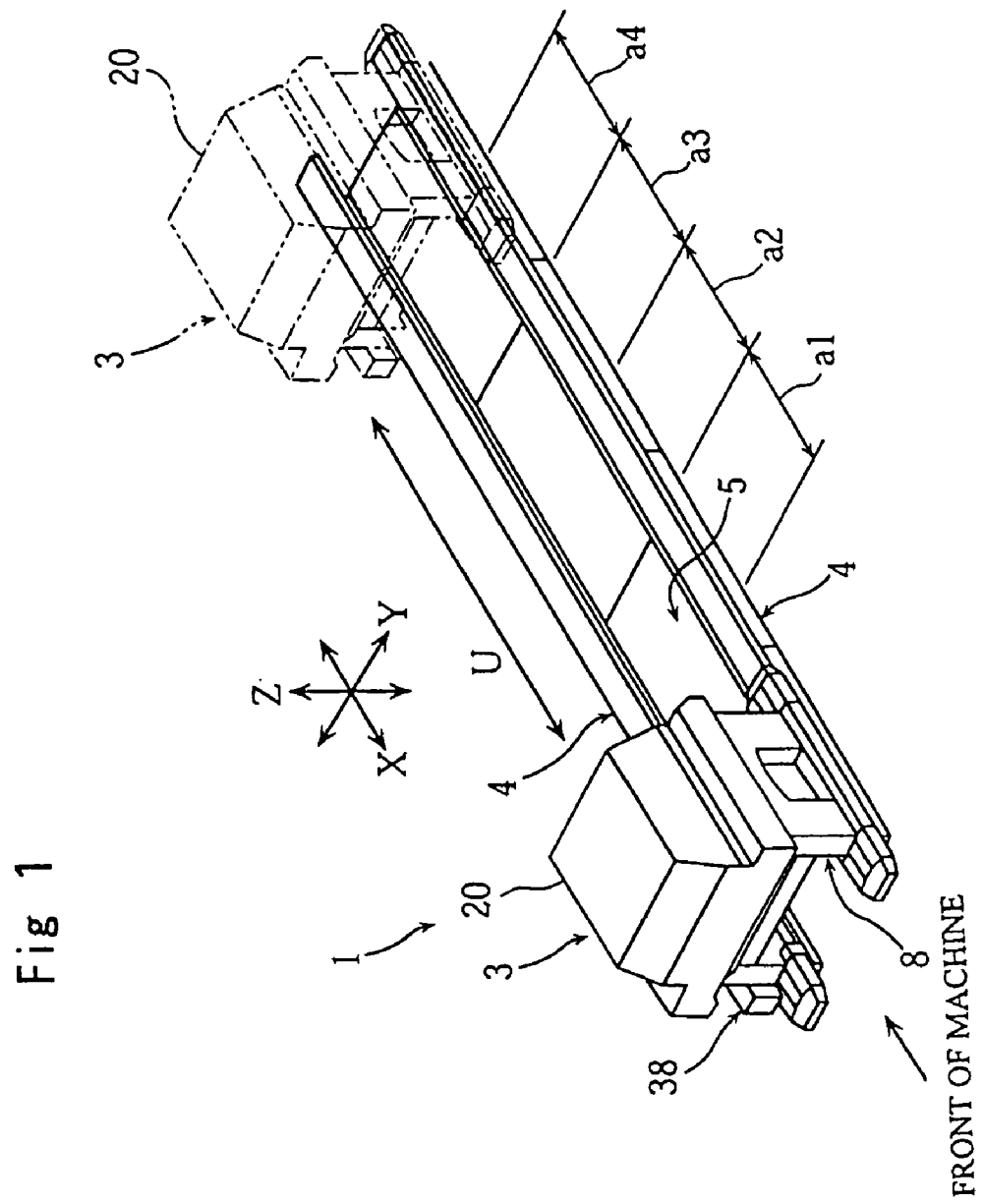
FIG. 1 is a perspective view of an entire vertical machining center according to a first embodiment of the present invention.
Figure 2:
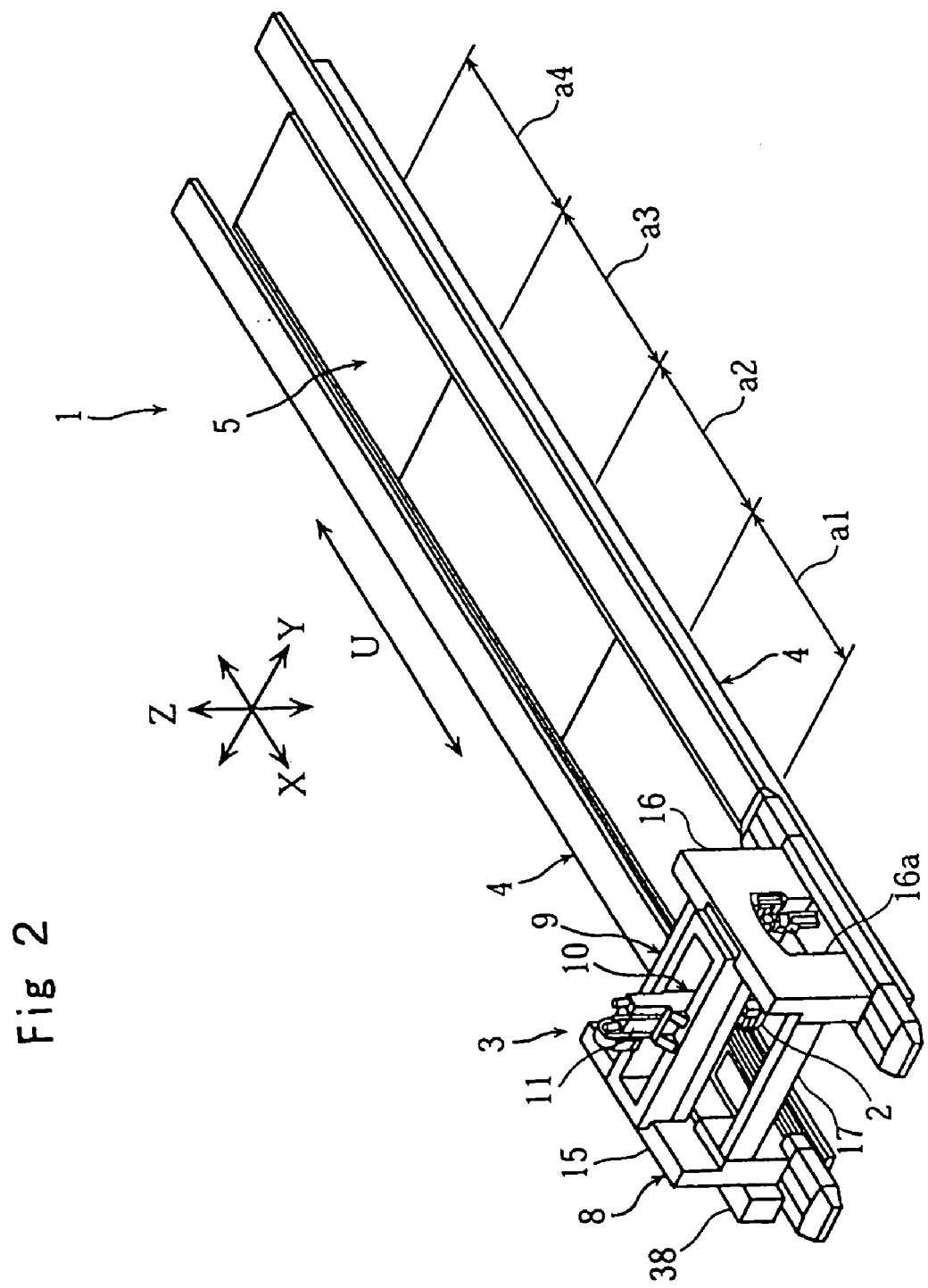
FIG. 2 is a perspective view of the vertical machining center.
Figure 3:
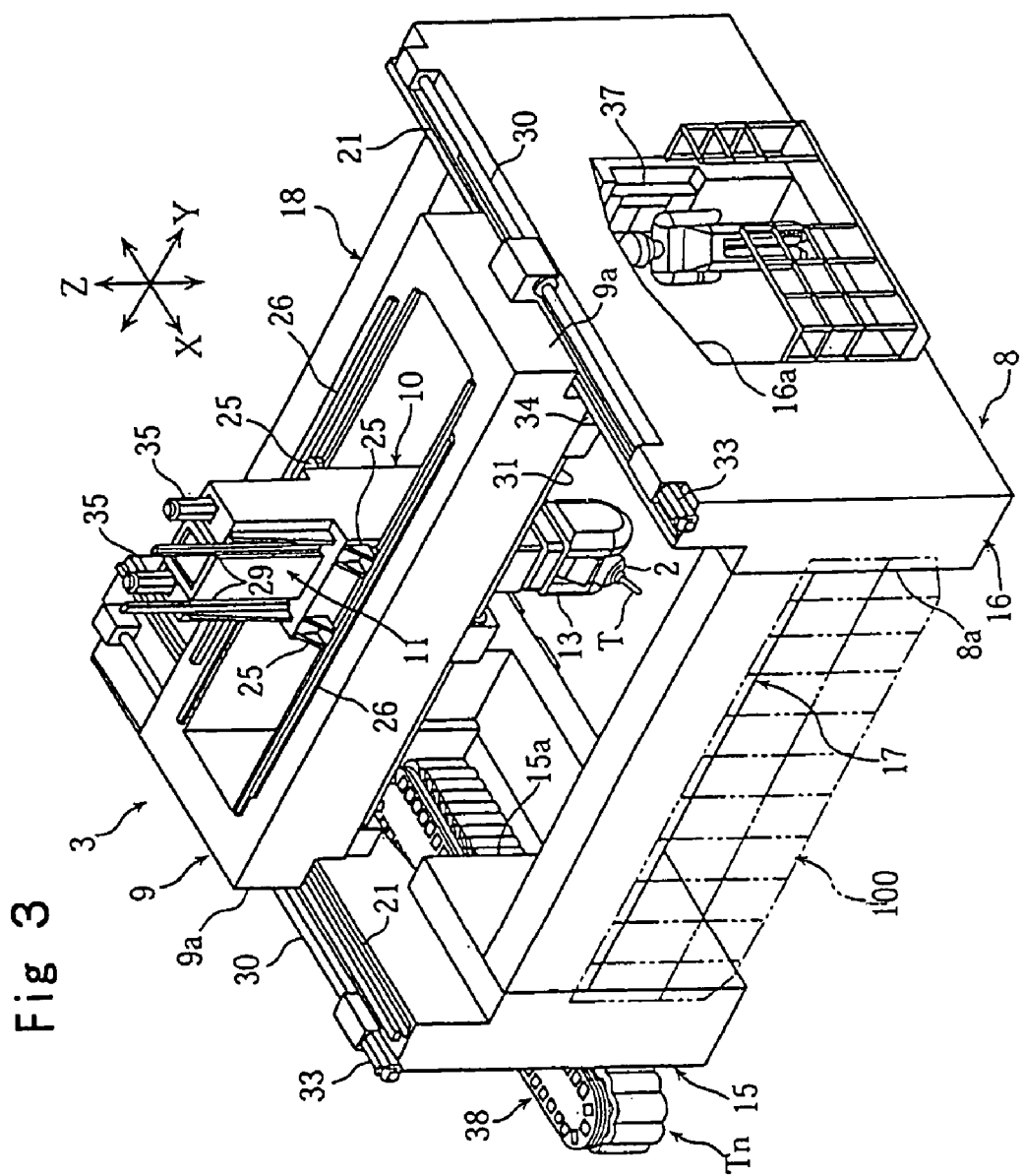
FIG. 3 is a perspective view of a machining unit of the embodiment.

Hereinafter, embodiments of the present invention will be described based on the attached drawings.

In the drawings, 1 denotes a vertical machining center, which includes: a machining unit 3 by which a spindle 2 with a tool T attached thereto is supported to be relatively movable in three axial directions, namely, X-axis, Y-axis, and Z-axis directions; and a pair of right and left beds 4,4 by which the machining unit 3 is supported to be movable in a U-axis direction (an arrangement direction of machining areas) parallel to the X-axis direction.

A machining table 5 is disposed between the right and left beds 4,4. This machining table 5 is a large-sized one having a length of 20 m to 30 m and a width of 3 m to 5 m, and has a plurality of machining areas a1 to a4 arranged in the U-axis direction. Further, in U-axis direction both end portions of the right and left beds 4,4, retreat spaces for the machining unit 3 are provided so as to be positioned on U-axis direction outer sides of the machining table 5, so that a wide and long workpiece (not shown) can be moved in an up/down direction for attachment/detachment while the machining unit 3 is kept positioned in the retreat space.

The machining unit 3 includes: a gate-shaped column 8 mounted on the right and left beds 4,4 so as to be bridged over the machining table 5, when seen in the U-axis direction from a front side of the machine; a cross rail 9 supported by the column 8 to be movable in the X-axis direction; a saddle 10 supported by the cross rail 9 to be movable in the Y-axis direction; and a ram 11 supported by the saddle 10 to be movable in the Z-axis direction, and the spindle 2 is disposed on a lower end of the ram 11 with an axis thereof being set substantially vertical.

Figure 6:
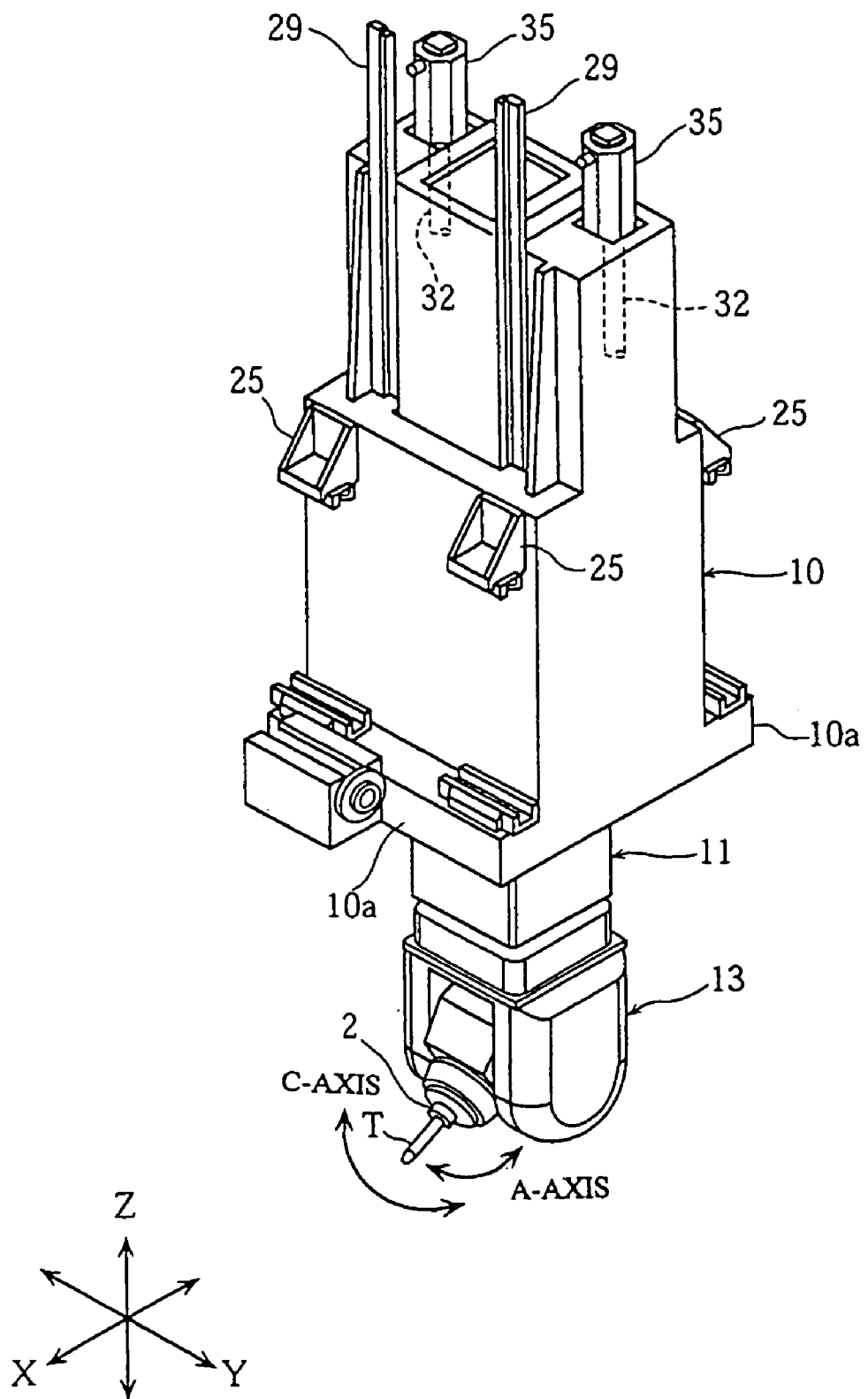
FIG. 6 is a perspective view of a ram of the machining unit.

As shown in FIG. 6, the ram 11 includes a rotary index device 13 for driving the spindle 2 to be rotary indexed in an A-axis direction around a line perpendicular to the axis and in a C-axis direction around the axis, thereby enabling workpiece machining by five-axis control.

The gate-shaped column 8 is structured such that front walls and rear walls of left and right column main bodies 15, 16 with substantially rectangular shape in a side view disposed on the left and right beds 4 are integrally coupled by front and rear cross frames 17, 18. Each of the left and right column main bodies 15, 16 is supported by pair of U-axis guide rails 19, 19 disposed on an upper face of each of the beds 4,4 to be movable in the U-axis direction. Further, a ceiling portion of the gate-shaped column 8 is covered with a cover 20.

The cross rail 9 is in a rectangular box shape having a vertical opening therein, and in a plane view, is disposed in a space surrounded by the left and right column main bodies 15, 16 and the front and rear cross frames 17, 18. Further, the cross rail 9 has flange portions 9a, 9a formed in left and right upper edge portions, and the left and right flange portions 9a are supported by X-axis guide rails 21, 21 provided on upper faces of the column main bodies 15, 16 to be movable in the X-axis direction.

The saddle 10 is in a square cylindrical shape having a vertical opening, and is disposed in the cross rail 9. On each of front and rear walls of the saddle 10, a pair of triangular brackets 25, 25 are fixedly attached, and the front and rear brackets 25, 25 are supported by Y-axis guide rails 26, 26 provided on front and rear upper faces of the cross rail 9 to be movable in the Y-axis direction.

Further, in lower edges of the front and rear walls of the saddle 10, flange portions 10a, 10a are formed, and the front and rear flange portions 10a are supported by Y-axis guide rails 27, 27 provided on front and rear lower faces of the cross rail 9 to be movable in the Y-axis direction. The saddle 10 is thus sandwiched by the upper and lower Y-axis guide rails 26, 27.

The ram 11 is in a square cylindrical shape extending vertically, and is disposed in the saddle 10. Four faces, namely, front, rear, right, and left walls of the ram 11 are supported via slippery faces (not shown) provided on inner wall faces of the saddle 10 to be movable in the Z-axis direction. Note that 29 denotes a scale detecting a Z-axis direction position of the ram 11.

X-axis and Y-axis strokes are set to about 3 m to about 4 m, and a Z-axis stroke is set to about 1 m to about 2 m. Further, the cross rail 9, the saddle 10, and the ram 11 are driven to reciprocate by ball screws 30, 31, 32 and servo motors 33, 34, 35, respectively.

The right column main body 16 has an opening 16a for work space large enough for an operator to get in/out therethrough, and a not-shown door separating the inside and outside of the machine is provided in the opening 16a. Further, an operation panel 37 is disposed on an outer side of the door inside the opening 16a for work space.

A tool magazine 38 holding a large number of tools Tn is disposed on an outer wall of the left column main body 15. Further, the column main body 15 has a tool change window 15a provided in a portion facing a tool change position, and through this tool change window 15a, a not-shown tool change arm automatically changes a tool T attached to the spindle 2 and having finished machining to a subsequent process tool held by the tool magazine 38.

Figure 5:
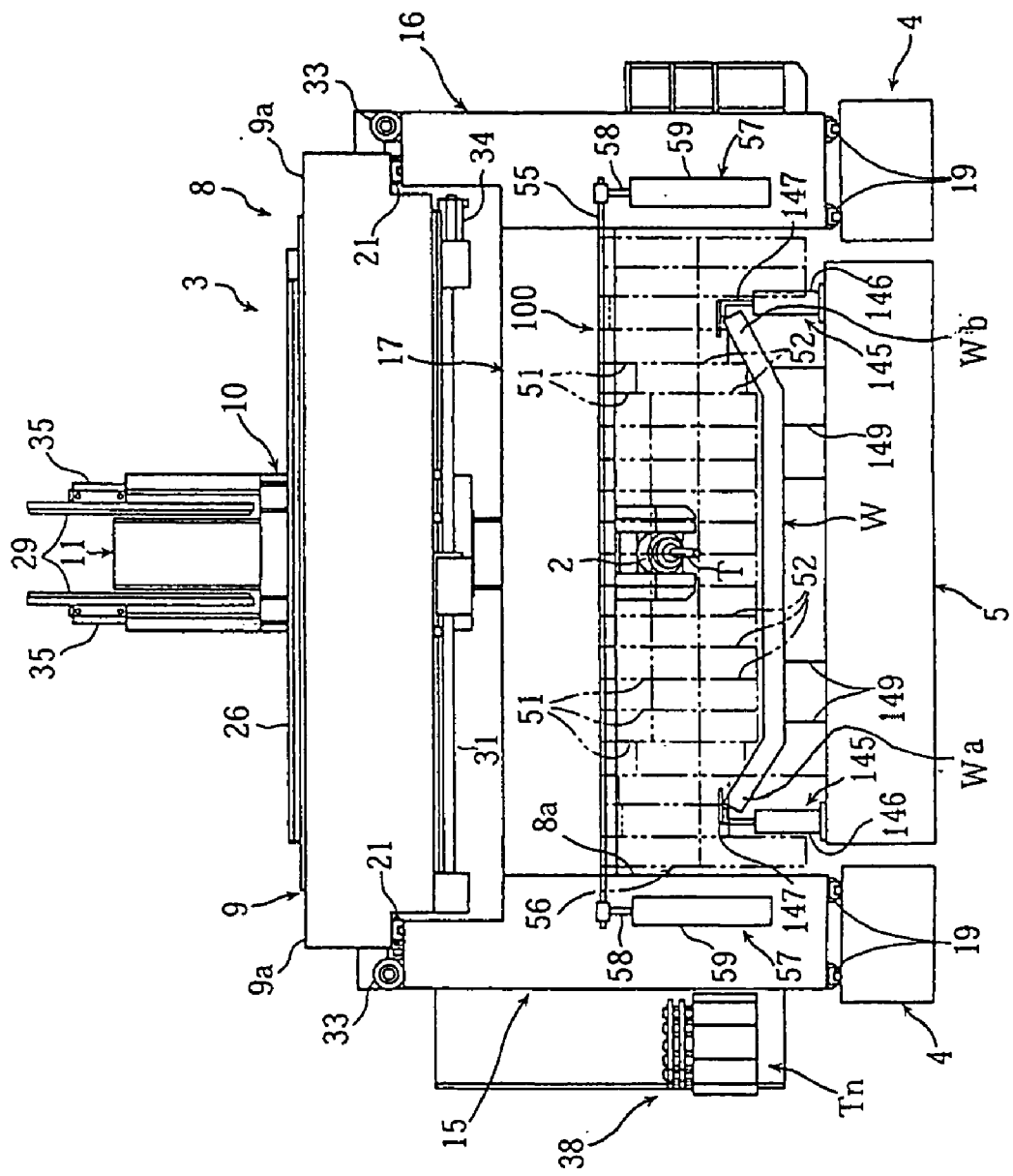
FIG. 5 is a front view of the machining unit.

As shown in FIG. 5, clamping devices 145 are disposed on right and left end portions of the machining table 5, being predetermined interval apart from each other in a longitudinal direction. Each of the clamping devices 145 is roughly structured such that a clamping rod 147 is supported by a hydraulic cylinder 146 to be reciprocative. The clamping rods 147 are moved down while catching left and right outer peripheral portions Wa, Wb of a wide and long workpiece W, thereby fixedly positioning the wide and long workpiece W on the machining table 5. Further, jigs 149 supporting a lower face of the wide and long workpiece W are disposed on the machining table 5.

In front and rear openings 8a, 8b formed by the left and right column main bodies 15, 16, the front and rear cross frames 17, 18, and the machining table 5, shielding mechanisms 100 preventing chips and coolant from scattering out of the machine during machining are disposed, and the shielding mechanisms 100 are structured as follows.

Figure 4:
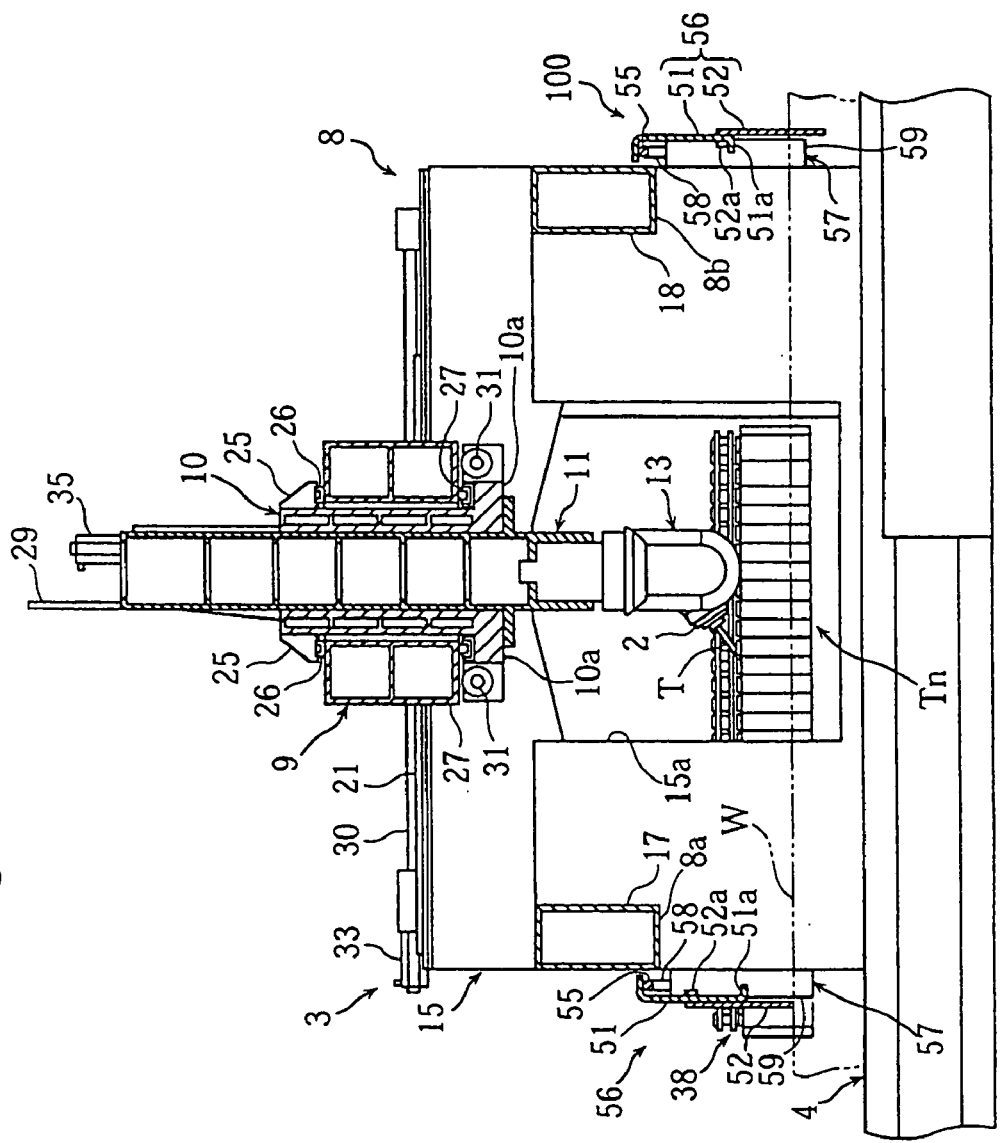
FIG. 4 is a side cross-sectional view of the machining unit.

As shown in FIG. 4, FIG. 5, each of the shielding mechanisms 100 is structured such that a large number of band-plate shaped curtain plates 56 are hung from and supported by a stick member 55 extending between the left and right column main bodies 15, 16, and piston rods 58 of right and left cylinder mechanisms (driving mechanisms) 57 are coupled to both end portions of the stick member 55. The cylinder mechanisms 57 are fixedly attached to each of front and rear outer wall faces of the left and right column main bodies 15, 16.

Each of the cylinder mechanisms 57 is structured such that a not-shown piston is slidably inserted in a cylinder 59 and the piston rod 58 is connected to the piston, and the front and rear cylinder mechanisms 57 drive the curtain plates 56 via the stick members 55 to move up/down between a closing position and an opening position for substantially closing and opening the front and rear openings 8a, 8b respectively.

As shown in FIG. 4, the curtain plates 56 have upper plates 51 covering upper half portions of the openings 8a, 8b and lower plates 52 covering lower half portions thereof, and upper end portions of the upper plates 51 are fixedly attached to the stick members 55.

Each of the upper plates 51 has a bent stopper portion 51a formed in a lower end portion. Further, each of the lower plates 52 has a ring-shaped catch portion 52a in an upper end portion. The upper plate 51 is inserted in the catch portion 52a, and the catch portion 52a regulates a lower end position of the lower plate 52 by abutting on the stopper portion 51a. Whereby, the lower plates 52 are supported by the upper plates 51 to be vertically movable. When the curtain plates 56 move down to the closing position and the lower plates 52 abut on the workpiece W, the lower plates 52 stop at this position, thereby absorbing difference in height position among widthwise portions of the wide and long workpiece W.

For workpiece machining by the vertical machining center 1 of this embodiment, the wide and long workpiece W is placed on and supported by the jigs 149 of the machining table 5 and is fixedly positioned by the clamping devices 45. Next, the machining unit 3 placed in the retreat space is moved to the first machining area a1 to be fixedly positioned. Subsequently, the front and rear curtain plates 56 are moved down. As a result, the lower plates 52 abut on an upper face of the wide and long workpiece W sequentially in a width direction, and when they further move down to the closing position, the lower plates 52 stop at a workpiece abutting position to move relatively upward, so that the difference in height position among respective portions of the workpiece W is absorbed and thus the openings 8a, 8b above the workpiece W are shielded. Note that the other lower plates 52 positioned on a widthwise outer side of the workpiece W move down to a lower end position close to a surface of the machining table 5.

In this state, the tool T applies predetermined machining to the wide and long workpiece W while the spindle 2 is relatively moved in the X-axis, Y-axis, and Z-axis directions. In this case, since the front and rear openings 8a, 8b of the column 8 are covered with the upper and lower plates 51, 52, chips and coolant do not scatter out of the machine during the machining.

When the workpiece machining is finished, the machining unit 3 is moved to the next machining area a2. In the machining area a2, similarly to the above, the openings 8a, 8b are covered with the curtain plates 56, and then the spindle 2 performs workpiece machining. In this manner, the machining unit 3 is moved to the machining areas a1 to a4 sequentially, so that the spindle 2 performs workpiece machining in each of the machining areas a1 to a4. Concretely, this machining is suitable for forming windows at predetermined intervals by boring in a large vehicle body, for example, a train or a bus or for forming bolt holes and the like in outer peripheral portions of window holes.

In this embodiment, the shielding mechanisms 100 each including a large number of the curtain plates 56 are disposed in the front and rear openings 8a, 8b formed by the front and rear cross frames 17, 18, the left and right column main bodies 15, 16, and the machining table 5. Since the left and right sides of a machining area by the spindle 2 are shielded by the column main bodies 15, 16, it is only necessary to shield the front and rear openings 8a, 8b formed by the left and right column main bodies 15, 16 and the front and rear cross frames 17, 18. Therefore, it is possible to downsize the shielding mechanisms 100 compared with a conventional case where the whole outer periphery of the machine main body is shielded, which can suppress cost increase.

In this embodiment, the column 8 is movable to each of the machining areas a1 to a4 of the machining table 5, and the curtain plates 56 are driven to move up/down between the closing position for substantially closing the front and rear openings 8a, 8b by abutting on the wide and long workpiece W and the opening position for opening the openings 8a, 8b. This structure makes it possible to surely shield the openings 8a, 8b above the long and wide workpiece W placed on the machining table 5 when the workpiece W is machined.

In this embodiment, a large number of the band-plate shaped curtain plates 56 hung from and supported by the stick members 55 are driven to move up/down by the cylinder mechanisms 57. Therefore, with a simple structure and without any need for providing a special installation place, the shielding mechanisms 100 can be disposed, and the curtain plates 56 can be prevented from interfering with the workpiece W when the column 8 is moved.

Each of the curtain plates 56 is composed of the upper plate 51 supported by the stick member 55 and the lower plate 52 supported by the upper plate 51 to be vertically movable. Therefore, when the wide and long workpiece W having difference in height position among respective widthwise portions is machined, the openings 8a, 8b above the workpiece W can be automatically and surely shielded with a simple structure.

Figure 7:
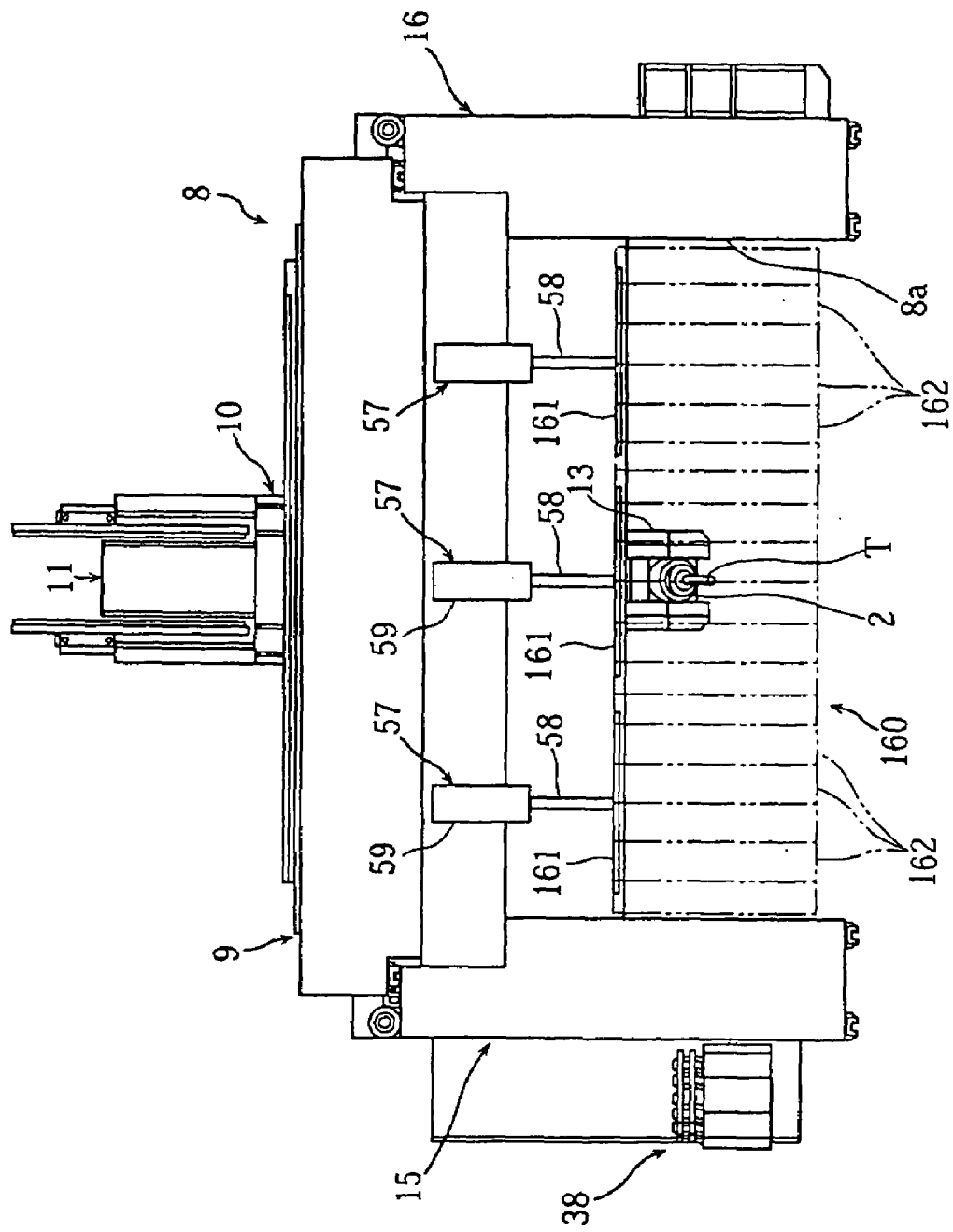
FIG. 7 is a front view of a machining unit according to a second embodiment of the present invention.

FIG. 7 is a view to describe shielding members according to a second embodiment of the present invention. The same reference numerals as those in FIG. 5 denote the same or corresponding portions.

A shielding mechanism 160 of this embodiment is structured such that three cylinder mechanisms 57 are arranged between left and right column main bodies 15, 16 at predetermined intervals, piston rods 58 of the cylinder mechanisms 57 are fixed to, stick members 161, and a large number of curtain plates 162 are hung from and supported by the stick members 161 to be vertically movable. Note that each of the cylinder mechanisms 57 is fixedly attached to the cross frame 17 or 18.

The cylinder mechanisms 57 independently drive the curtain plates 162 via the respective stick members 161 to move up/down between a closing position and an opening position. When the stick members 161 move down so that the curtain plates 162 abut on a workpiece, the curtain plates 162 stop at this abutting position. In this manner, the openings 8a, 8b can be shielded.

In this embodiment, the three cylinder mechanisms 57 independently drive the curtain plates 162 to move up/down, so that it is possible to open/close only a necessary portion of the openings 8a, 8b, which realizes higher operability when the present invention is applied to a large machine tool with a large opening area.

The invention may be embodied in other specific forms without departing from the spirit or essential characteristics thereof.

The present embodiments are therefore to be considered in all respects as illustrative and no restrictive, the scope of the invention being indicated by the appended claims rather than by the foregoing description, and all changes which come within the meaning and range of equivalency of the claims are therefore intended to be embraced therein.

What is claimed is:

1. A machine tool in which a spindle with a tool attached thereto is relatively moved to apply predetermined machining to a workpiece placed on a machining table, the machine tool comprising:
    a machining unit by which the spindle is supported to be movable in X-axis, Y-axis, and Z-axis directions relative to the machining table; and
    a shielding mechanism provided in said machining unit to prevent chips and coolant from scattering out of a machining area; and
    wherein said machining unit includes a column in which front and rear end portions of right and left column main bodies disposed on right and left sides of the machining table are coupled by front and rear cross frames,
    wherein said spindle is disposed in a portion surrounded by the front and rear cross frames and the right and left column main bodies with an axis thereof being set substantially vertical, and
    wherein said shielding mechanism includes front and rear shielding members hung from the front and rear cross frames to be vertically movable and opening/closing front and rear openings formed by the column main bodies, the cross frames, and the machining table; and
    wherein said machining table has a plurality of machining areas arranged in one direction,
    wherein said machining unit is mounted on a long bed extending in the arrangement direction of the machining areas to be movable in the arrangement direction of the machining areas, and moves said spindle in the X-axis, Y-axis, and Z-axis directions while being kept positioned in one of the machining areas, thereby machining the workpiece, and
    wherein the front and rear shielding members open/close the front and rear openings while said machining unit is positioned in one of the machining areas.

2. The machine tool according to claim 1,
    wherein said shielding members have: front and rear stick members bridged between the right and left column main bodies; and a large number of band-plate shaped curtain plates hung from and supported by the front and rear stick members, and the stick members are driven by a driving mechanism to move up/down between a closing position for substantially closing the openings and an opening position for opening the openings.

3. A machine tool in which a spindle with a tool attached thereto is relatively moved to apply predetermined machining to a workpiece placed on a machining table, the machine tool comprising:
    a machining unit by which the spindle is supported to be movable in X-axis, Y-axis, and Z-axis directions relative to the machining table; and
    a shielding mechanism provided in said machining unit to prevent chips and coolant from scattering out of a machining area; and
    wherein said machining unit includes a column in which front and rear end portions of right and left column main bodies disposed on right and left sides of the machining table are coupled by front and rear cross frames,
    wherein said spindle is disposed in a portion surrounded by the front and rear cross frames and the right and left column main bodies with an axis thereof being set substantially vertical, and
    wherein said shielding mechanism includes front and rear shielding members hung from the front and rear cross frames to be vertically movable and opening/closing front and rear openings formed by the column main bodies, the cross frames, and the machining table; and
    wherein said shielding members have: front and rear stick members bridged between the right and left column main bodies; and a large number of bandplate shaped curtain plates hung from and supported by the front and rear stick members, and the stick members are driven by a driving mechanism to move up/down between a closing position for substantially closing the openings and an opening position for opening the openings.

4. The machine tool according to claim 3,
    wherein the curtain plates are hung from the stick members to be vertically movable and stop at a position abutting on the workpiece when the stick members are moved down to the closing position.

5. The machine tool according to claim 4,
    wherein each of the curtain plates is composed of an upper plate supported by the stick member and a lower plate supported by the upper plate to be vertically movable, and when the stick members are moved down to the closing position, the lower plates stop at a position abutting on the workpiece.

6. The machine tool according to claim 3,
    wherein each of the curtain plates is composed of an upper plate supported by the stick member and a lower plate supported by the upper plate to be vertically movable, and when the stick members are moved down to the closing position, the lower plates stop at a position abutting on the workpiece.

* * * * *